United States Patent [19]

Waldmann et al.

[11] 4,008,428
[45] Feb. 15, 1977

[54] CIRCUIT ARRANGEMENT WITH A NUMBER OF FREQUENCY CONVERTERS, PARTICULARLY Y-CONNECTED DIRECT FREQUENCY CONVERTERS

[75] Inventors: Hermann Waldmann; Manfred Weibelzahl, both of Weiher, Germany

[73] Assignee: Siemens Aktiengesellschaft, Munich, Germany

[22] Filed: Jan. 7, 1976

[21] Appl. No.: 647,110

[30] Foreign Application Priority Data

Jan. 22, 1975 Germany ............................ 2502513

[52] U.S. Cl. ........................... 321/69 R; 318/227
[51] Int. Cl.² ................................... H02P 13/30
[58] Field of Search ............... 321/60, 61, 65, 66, 321/69 R; 318/227, 230, 231

[56] References Cited

UNITED STATES PATENTS

| | | | |
|---|---|---|---|
| 3,332,002 | 7/1967 | Jollois | 321/69 R |
| 3,775,649 | 11/1973 | Bayer et al. | 318/227 |
| 3,942,091 | 3/1976 | Weibelzahl | 321/69 R |

Primary Examiner—William H. Beha, Jr.
Attorney, Agent, or Firm—Kenyon & Kenyon Reilly Carr & Chapin

[57] ABSTRACT

A circuit arrangement is disclosed having an odd number of Y-connected frequency converters. The control units of the frequency converters are associated with current regulators, all of which are addressed by an additional common reference value. In accord with the invention, the aforesaid reference value is derived by generating a difference voltage corresponding to the difference of the voltages at the neutral point of the frequency converter circuit and the neutral point of the load. This difference voltage is then passed through a delay member whose time constant corresponds to the time constant of the load to develop the reference value.

1 Claim, 1 Drawing Figure

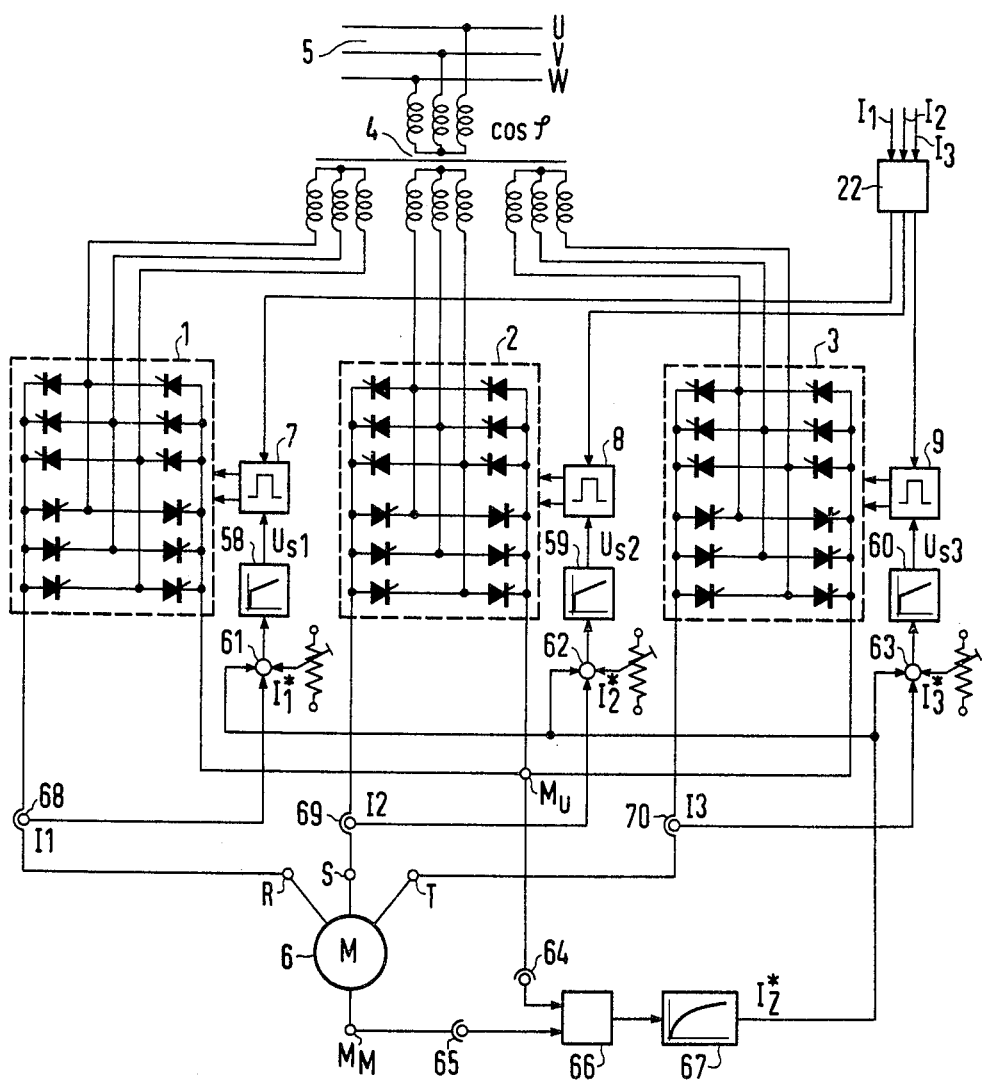

CIRCUIT ARRANGEMENT WITH A NUMBER OF FREQUENCY CONVERTERS, PARTICULARLY Y-CONNECTED DIRECT FREQUENCY CONVERTERS

BACKGROUND OF THE INVENTION

1. Field of the Invention

The invention relates to a circuit arrangement with an odd number of converters and, in particular, with an odd number m of direct frequency converters.

2. Description of the Prior Art

A circuit arrangement is known in which a number of direct frequency converters are connected in a symmetrical Y-connection to a symmetrical m-phase load without a direct connection between the neutral point of the frequency converters and the neutral point of the load. In this circuit arrangement, the conductor voltages at the load each have a predetermined periodic waveform and together form a symmetrical system. More particularly, in such circuit arrangement control voltages are coupled into control units of the m frequency converters in such a manner that the output voltages of the converters have substantially a trapezoidal waveform.

If, in this circuit arrangement, a current regulator were associated with each converter and the arrangement were operated with the neutral point of the load open, then the output voltages of the current regulators, which voltages serve as the control voltages for the control units of the converters, would be divergent, as the regulators would have an integral component in their time behavior. The reason for this is that with the neutral point of the load open, the sum of all phase currents must be equal to zero.

SUMMARY OF THE INVENTION

It is an object of the present invention to modify such a circuit arrangement so as to permit operation with the neutral point of the load open. The above and other objectives are realized in accordance with the invention by associating the control units of the converters with current regulators, each of which is fed on its input side by an actual current value, a reference current value associated with its respective frequency converter and by an additional reference value which is common to all the current regulators. More particularly, in accordance with the invention the common reference is developed by taking the difference between the voltages at the neutral points of the frequency converter circuit and the load and by coupling the difference signal through a delay member whose time constant corresponds to the time constant of the load.

Operation with the neutral point open has considerable advantages particularly for supplying electrical machines, as the machine current has a lower harmonic content. More particularly, if the neutral point is open, a trapezoidal frequency converter voltage is formed automatically, while the machine voltage remains sinusoidal.

BRIEF DESCRIPTION OF THE DRAWINGS

The above and other features and aspects of the present invention will become more apparent upon reading the following detailed description in conjunction with the accompanying drawings, in which:

FIG. 1 shows a circuit arrangement in accordance with the principles of the present invention.

DETAILED DESCRIPTION

As shown, the circuit arrangement of the invention comprises three frequency converters 1, 2, and 3 which are connected, via a transformer 4 which has three separated secondary windings, to the phase conductors U, V, W, respectively, of a three-phase network 5. The frequency converters 1, 2, and 3 are reversing converters and, in particular, direct converters. Each converter includes two antiparallel subconverters each having a plurality of controlled valves, shown as thyristors, which are arranged in a three-phase bridge circuit. One output lead of each of the converters is connected to a common converter netural point $M_U$. The respective other output lead of each converter is connected to one of the terminals R, S, T of a rotating-field machine 6, the windings of which are Y-connected. The rotating-field machine 6, which may be a synchronous or an asynchronous machine, acts as a symmetrial three-phase load and has its neutral point $M_M$ brought out but unconnected with the converter neutral $M_U$.

Associated with the frequency converters 1, 2, 3 are linear control units 7, 8 and 9 respectively. These control units are included in current control loops and are responsive to the control voltages $U_{s1}$, $U_{s2}$ and $U_{s3}$ developed by the current controllers 58, 59 and 60, respectively. In response to these signals the units supply the controlled valves of their respective converters with firing pulses having a fixed order and a predetermined control angle. Each of the converters 1, 2 or 3 is, therefore, associated with a current control circuit for controlling its respective load side output current $I_1$, $I_2$, or $I_3$.

The current controller 58 is fed the output of a comparator member 61 which compares the actual load side current of the converter 1 as measured by a current measuring transformer 68, with a predetermined current reference value $I_1^*$ and an additional reference value $I_z^*$. The current reference value $I_1^*$ has a sinusoidal waveform and is derived from a reference value setter, which is schematically shown as a potentiometer. A sinusoidal waveform can be realized for the reference value $I_1^*$ by feeding the potentiometer with a current of sinusoidal waveform. In general, however, the reference value $I_1^*$ will be generated by specific, known reference value transmitters which furnish a three-phase system of reference voltages.

Current controllers 59 and 60 are similarly fed the outputs of comparators 62 and 63, respectively. The comparator 62 compares the load side output current $I_2$ derived from the measuring transformer 68 with a second predetermined current value $I_2^*$, also developed by a reference value setter shown as a potentiometer, and with the additional common reference $I_z^*$. Likewise, the comparator 63 compares the actual load side output current $I_3$ coupled to it from the transformer 70 with a third predetermined reference current $I_3^*$ generated by a potentiometer reference setter and with the common references $I_z^*$.

The common reference value $I_z^*$ is formed by a delay member 67, the time constant of which corresponds to the time constant of the machine 6. The delay member 67 is fed on its input side with a difference voltage corresponding to the difference between the voltage at the converter neutral point $M_U$ and the voltage at the machine neutral point $M_M$. This difference voltage is generated by a difference amplifier 66 which is fed the voltages at the points $M_U$ and $M_M$, respectively, via the measuring transformers 64 and 65, both of which have floating output potentials.

As can be appreciated from the above, in the present circuit arrangement, a separate current control is thus associated with each of the three frequency converters. As a result, three mutually independent control circuits are originally created. In particular, as above-described, the output voltages of the three current controllers 58, 59 and 60 are fed as control voltages to the respective control units 7, 8 and 9 and, thus, influence the corresponding frequency converters. The voltages generated by the frequency converters in turn are the terminal voltages of the machine 6. In the machine, the difference between a given terminal voltage and the respective induced countervoltage of one phase forms, via the time constant of the stator winding, one of the stator or load side currents which is fed to its respective current regulator as an actual current value. If the frequency converter neutral $M_U$ is not connected with the machine neutral $M_M$, however, each frequency converter acts on all three stator currents with a factor ⅔ on its own phase and with a factor ⅓ on the other two phases. This coupling tends to cause unstable behavior, as the current regulators attempt to compensate for its disturbing influence. In the present circuit arrangement such disturbing coupling is avoided by feeding an additional reference value to all three current regulators. In particular, this is possible because the influence of the coupling can be traced back to a null system, where the voltage difference between the neutral point voltages at the frequency converter neutral and at the machine neutral is proportional to the sum of the terminal voltages of the machine. This voltage difference acts on the three stator currents via the machine time constant. In the present circuit arrangement the aforesaid effect is simulated by feeding the difference of the voltages at the neutral point $M_M$ and $M_U$ to the three current controllers 58, 59 and 60 via the delay member 67, whose time constant corresponds to the machine time constant. The current controllers are thereby prevented from running away.

As shown, the present circuit arrangement also includes a command stage 22 which is acted upon by the actual current values $I_1$, $I_2$, $I_3$. These actual current values can also be provided by the current measuring transformers 68, 69, 70. The command stage 22 forms for each control unit 7, 8, 9 a signal which indicates for which of its two subconverters the control pulses are to be released. With a positive conductor current $I_1$, for example, the upper part of the frequency converter 1 is released. However, it is also possible to feed only two actual current values to the command stage 22, e.g., $I_1$, $I_2$ and to utilize the requirement that the sum of the three conductor currents must be equal to zero.

what is claimed is:

1. A circuit arrangement for use with an m-phase symmetrical load whose conductor voltages have a predetermined periodic waveform and together form a symmetrical system, said circuit arrangement comprising:

an odd number m of direct frequency converters connected in a Y-connection and to said load without a direct connection between the neutral point of said converters and the neutral point of said load;

control units for feeding control voltages to said converters such that the output voltages of said converters have a substantially trapezoidal waveform;

current regulators each associated with one of said control units and each being responsive to the load side current generated by one of said converters, to a current reference value associated with that one converter and to a common current reference value common to all said regulators;

and means for forming said common current reference value including means for developing a difference signal corresponding to the voltage difference between the voltages at the neutral point of said converters and the neutral point of said load and a delay member responsive to said difference signal and having a time constant corresponding to the time constant of said load.

* * * * *